United States Patent
Benoit

(10) Patent No.: US 6,269,523 B1
(45) Date of Patent: Aug. 7, 2001

(54) REEF MAKER

(76) Inventor: Richard Benoit, 53 Manters Point, Plymouth, MA (US) 02360

( * ) Notice: Subject to any disclaimer, the term of this patent is extended or adjusted under 35 U.S.C. 154(b) by 0 days.

(21) Appl. No.: 09/409,051

(22) Filed: Sep. 30, 1999

(51) Int. Cl.[7] .................................................. F16G 11/00
(52) U.S. Cl. ............................ 24/130; 24/129 R; 24/128
(58) Field of Search .................................. 24/130, 129 R, 24/128, 18

(56) References Cited

U.S. PATENT DOCUMENTS

| 2,151,609 | * | 3/1939 | Menderman | 24/129 R |
| 4,653,422 | * | 3/1987 | Allen | 24/129 R |
| 4,878,270 | * | 11/1989 | Westerkamp | 24/132 R |
| 4,912,816 | * | 4/1990 | Brandt | 24/129 R |
| 4,930,193 | * | 6/1990 | Baker | 24/129 R |
| 5,230,295 | | 7/1993 | Shell . | |
| 5,339,498 | | 8/1994 | Parsons . | |
| 5,351,367 | | 10/1994 | Kennedy et al. . | |
| 5,806,452 | | 9/1998 | Benoit . | |
| 5,809,618 | | 9/1998 | Perhacs . | |
| 5,987,710 | * | 11/1999 | Paul et al. | 24/130 |
| 6,094,783 | * | 8/2000 | Parsons | 24/130 |

* cited by examiner

Primary Examiner—Victor N. Sakran
(74) Attorney, Agent, or Firm—Patent & Trademark Services; Joseph H. McGlynn

(57) ABSTRACT

A tie down for securing a rope. The tie down has a tapered channel for retaining one end of a length of rope, and a channel with a series of teeth on opposite ends of the channel for securing the other end of the rope. By selecting a portion of the rope to be secured in the channel, a user can form a loop in the rope which can be used to tie down or secure a variety of objects.

5 Claims, 1 Drawing Sheet

REEF MAKER

BACKGROUND OF THE INVENTION

This invention relates, in general, to a tie down, and, in particular, to a tie down which can be used with different size ropes

DESCRIPTION OF THE PRIOR ART

In the prior art various types of a tie down have been proposed. For example, U.S. Pat. No. 5,230,295 to Shell discloses a tie down having a cleat for attaching a rope at one end and a hook at an opposite end for securing the tie down to a support.

U.S. Pat. No. 5,339,498 to Parsons discloses a tie down which has a pair of channels for receiving a rope, and the rope is threaded through the channels to secure the rope.

U.S. Pat. No. 5,351,367 to Kennedy et al discloses a line tensioner which has three bores therethrough and a rope is threaded through he bores to secure the rope.

U.S. Pat. No. 5,809,618 to Perhacs discloses a tightener which comprises a housing, a retainer and a deflector. The housing is movable from a first position to a second position to retain an extra length of rope.

U.S. Pat. No. 5,806,452 to Benoit discloses a boat cleat having a plurality of teeth shaped to secure a rope when the rope is pulled in one direction and shaped to release a rope when it is pulled in the opposite direction.

SUMMARY OF THE INVENTION

The present invention is directed to a tie down for securing a rope. The tie down has a tapered channel for retaining one end of a length of rope, and a channel with a series of teeth on opposite ends of the channel for securing the other end of the rope. By selecting a portion of the rope to be secured in the channel, a user can form a loop in the rope which can be used to tie down or secure a variety of objects.

It is an object of the present invention to provide a new and improved tie down.

It is an object of the present invention to provide a new and improved tie down which will accept different sizes of rope.

It is an object of the present invention to provide a new and improved tie down which will secure a length of rope with a variety of different sizes of loops.

It is an object of the present invention to provide a new and improved tie down which can be easily and quickly applied to a piece of rope in order to secure a variety of objects.

These and other objects and advantages of the present invention will be fully apparent from the following description, when taken in connection with the annexed drawings.

DESCRIPTION OF THE PREFERRED EMBODIMENT

Figure 1:
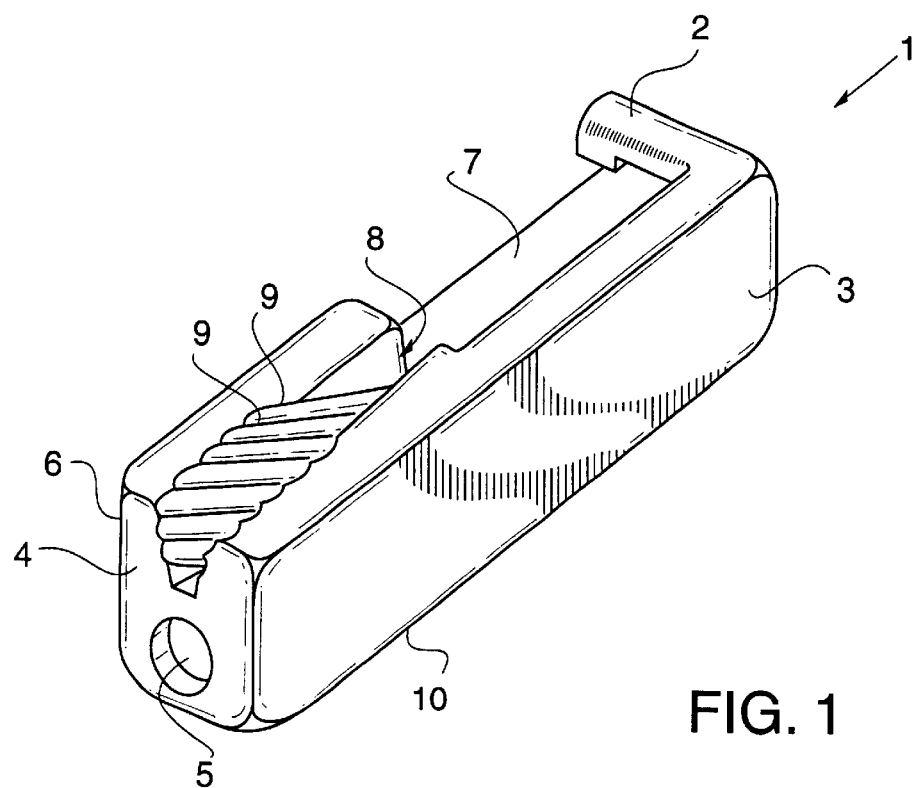
FIG. 1 is perspective view of the present invention.

Referring now to the drawings in greater detail, FIG. 1 shows a perspective view of the present invention 1. The tie down 1 of the present invention can be used to secure a variety of objects and is particularly useful on boats, where it can be used to, for example, make a reef in the sail of a sailboat. However, it should be understood that this is not the only use for the present invention, and it can be used in any environment where it is necessary to secure one object to another.

Figure 2:
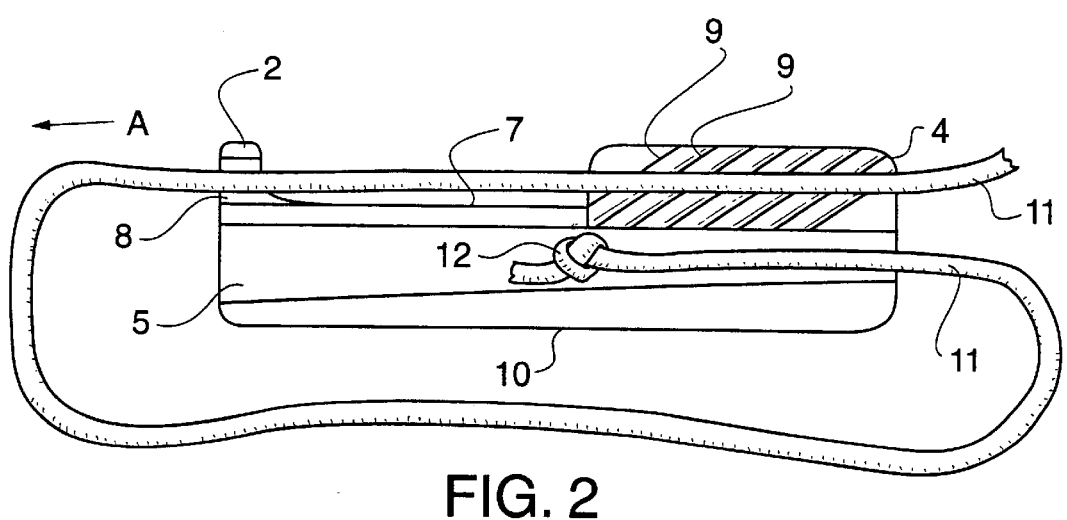
FIG. 2 is a partial view of the present invention showing the internal structure of the present invention.

As can be seen in FIG. 1, the tie down of the present invention has a housing comprising a top, sides 3, 6, ends 4 and a bottom 10. The visible end 4 in FIG. 1 has an aperture 5 that extends through the body from one end to the other (not visible in FIG. 1). As shown in FIG. 2, this aperture is tapered so that the opening of the aperture (to the left in FIG. 2) is larger than the opening (to the right in FIG. 2) for a purpose to be explained below.

The upper portion of the tiedown 1 has a channel 8, which is closed at the bottom of the channel and open to the top of the channel. The opposite walls, which form the channel, each have a plurality of slanted teeth 9, which extend from an area adjacent the top of the channel 8 to the bottom of the channel. The teeth 9 operate in the same manner as the teeth in U.S. Pat. No. 5,806,452, to Benoit, issued Sep. 15, 1998, which is hereby incorporated by reference. The teeth 9 are slanted so they will hold and secure a rope 1 which is pulled in the direction of the arrow A, in FIG. 2, but will release the rope 11 when it is pulled in the opposite direction.

The channel 8, as shown in FIG. 1, occupies only a portion of the top of the tie down 1. The rest of the top of the tie down has an open ledge 7 and an overhang 2, which overlies the ledge 7.

In order to use the tie down 1 of the present invention, a user would pass a rope through the aperture 5 from the large end to the small end. A knot 12 would be tied in the end of the rope 11 (see FIG. 2) that is large enough so the knot 12 will not pass through the small end of the apertures. The knot will prevent the end of the rope from passing completely through the aperture 5, and this will secure one end of the rope 11 within the aperture 5 in the tie down 1.

The unknotted end of the rope 11 will now be passed under the overhang 2 and pressed down into the channel 8 where it will be held securely by the slanted teeth 9. As shown in FIG. 2, this will form a loop. The loop can now be placed over an object (not shown) and the rope will be pulled in the direction opposite the arrow A, which will tighten the loop around the object.

If the tie down is to be used to secure an object that the loop can not be passed around, the object can be placed within the rope before the rope is passed under the overhang 2 and pressed down into the channel 8 where it will be held securely by the slanted teeth 9.

When it is desired to remove the object, the user merely pulls the rope in the direction opposite the arrow A in FIG. 2, which will release the rope from the teeth 9 and then remove the rope from under the overhang 2, which will release any object held within the loop.

Also, it should be noted that while the present invention has been described as being used on a boat, it is not limited to such a use, and can be used in any environment where an object is desired to be secured. In addition, the shape of the top of the tie down is not critical. The top of the tie down is shown as being rectangular in FIG. 1 and slightly curved in FIG. 2. Basically any shape on the top of the tie down can be used without departing from the scope of the present invention.

Although the Reef Maker and the method of using the same according to the present invention has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

What I claim as my invention is:

1. A tie down for securing objects, said tie down comprising:

a housing, said housing having a top, bottom, sides, and ends, said top of said housing having a channel therein, said channel being open adjacent said top of said housing and closed adjacent said bottom of said housing, an aperture extending completely through said housing from one of said ends to another of said ends, said aperture being tapered so that said aperture is larger at one of said ends than at said another of said ends.

2. The tie down as claimed in claim 1, wherein said channel has a pair of walls, and each of said walls has a plurality of teeth thereon.

3. The tie down as claimed in claim 2, wherein said plurality of teeth are slanted from a top of said channel to a bottom of said channel.

4. The tie down as claimed in claim 1, wherein said housing has an overhang, said overhang being positioned at an end of said housing opposite from said channel.

5. The tie down as claimed in claim 1, in combination with a rope, and wherein said rope has a selected diameter which will pass through said aperture, means on one end of said rope for enlarging said selected diameter, said means being of a size so it will pass through said larger end of said aperture, but will not pass through said smaller end of said aperture, another end of said rope being secured within said channel, thereby forming a loop in said rope.

* * * * *